Fig. 4.

May 22, 1945.  G. M. HARRY  2,376,429
VARIABLE SPEED POWER TRANSMISSION
Filed Jan. 21, 1944   5 Sheets-Sheet 5

FIG. 7

INVENTOR.
Geoffrey M. Harry,
BY
Davis, Lindsey, Smith & Shonts
Atty's

Patented May 22, 1945

2,376,429

UNITED STATES PATENT OFFICE 2,376,429

VARIABLE-SPEED POWER TRANSMISSION

Geoffrey M. Harry, Oak Park, Ill.

Application January 21, 1944, Serial No. 519,115

21 Claims. (Cl. 74—283)

This invention relates to a variable speed transmission and more particularly to an all-gear speed changing apparatus that is infinitely variable within a certain predetermined range of adjustment and by which the constant torque of a driving or input shaft may be transmitted to a driven or output shaft in infinitely varying degrees of speed.

Heretofore, there have been devised numerous types of variable speed transmission mechanisms for varying the speed of a driven member with respect to the constant speed of a driving member. These mechanisms involved the use of stepped cones, conical faced discs with connecting V-belts, numbers of gears operably connected in a train with a set amount of possible speeds, parallel and opposite conical faced pulleys with connecting belts, purely frictional mechanisms, and many other divers types of combinations. However, such well known types of variable speed mechanisms were limited in their application or use. In some it was possible to vary the speed of the driven member only from certain predetermined set speed ratios to others within a certain range of adjustment. These were not infinitely variable. For instance, within a given range of adjustment the speed of the driven member could be varied to but two, three, four, five, six, etc., different speeds but to those set speeds only. Such mechanisms were of little utility in instances wherein a speed adjustment to a point between the predetermined steps of speed was required by the nature of the machine or tool being operated or the work being done. Such mechanisms also had a further recognized disadvantage. In order to make the adjustment from one speed to another, it was necessary to stop and disconnect the variable speed mechanism from driving engagement with the driven machine, tool, or work being done, thus causing the machine or tool to remain idle for the corresponding period.

Likewise, the use of variable speed mechanisms such as the conical faced disc or pulley type with connecting belts wherein the principle of friction between contacting surfaces was employed for obtaining variations in the speed of the driven member was also relatively limited. On account of the great slippage between the friction surfaces under load only very light loads could be transmitted, and hence they were of little utility in the power field. These mechanisms were not of the positive power transmission type. Further, such mechanisms were subject to great wear between the friction surfaces, and as a result they were incapable of constant and uninterrupted usage due to shutdowns for friction surface renewals.

In addition, some attempts have been made to devise speed transmission mechanisms which were infinitely variable within a predetermined range. However, for varying reasons these attempts have proven relatively unsuccessful. Some were found to be relatively inefficient in that a great amount of power was required and a considerable portion of that power was lost in transmission between the driving and driven members. Others were undesirable because they were large, cumbersome and expensive; and still others possessed such an arrangement between the moving parts that those parts were subject to undue wear resulting in their relatively short life and requiring constant replacement. This replacement of parts was not only expensive as far as the cost of the parts was concerned but the various machines or tools to which the power was being transmitted were forced to stand idle during the repair period, thereby increasing production costs. The above referred to and other inherent disadvantages in all the various types of speed reducers have been well known to skilled workers in the field for years. These disadvantages have necessarily been tolerated for want of a satisfactory solution.

It is, therefore, an object of my invention to provide an improved power transmission mechanism which is variable in speed to all infinite degrees or variations within a predetermined range of adjustment.

Another object of my invention is to provide an infinitely variable power transmission mechanism which is of the all-gear type whereby a positive transmission of power can be maintained at every instant of operation and in which the wear of the moving parts has been reduced to a minimum.

Still another object of my invention is to provide an improved power transmission mechanism by which the speed of the driven member may be infinitely varied within a certain range of adjustment with respect to the speed of the driving member during the operation of the mechanism in the transmitting of power without disengaging the mechanism from operative engagement with the driving member or the source of power.

A further object of the invention is to provide a power transmission mechanism having such an arrangement and combination of parts that when the load of the work is applied to the driven or output shaft, a reaction results backwardly through the mechanism which tends to drive the mechanism itself and the driving shaft or member in the same direction as it is already being driven by the source of power, thereby reducing the loss of power between the driving and driven member to a minimum.

Still further objects of the invention are to provide a power transmission mechanism that is of compact and simple construction, relatively inexpensive to manufacture, and is a self-contained unit which has a wide range of adaptability to all types of mechanisms, meachinery and tools now in operative use.

Other and further objects and advantages of the present invention will become apparent as this description progresses, reference being had to the accompanying drawings, wherein.

Figure 1:
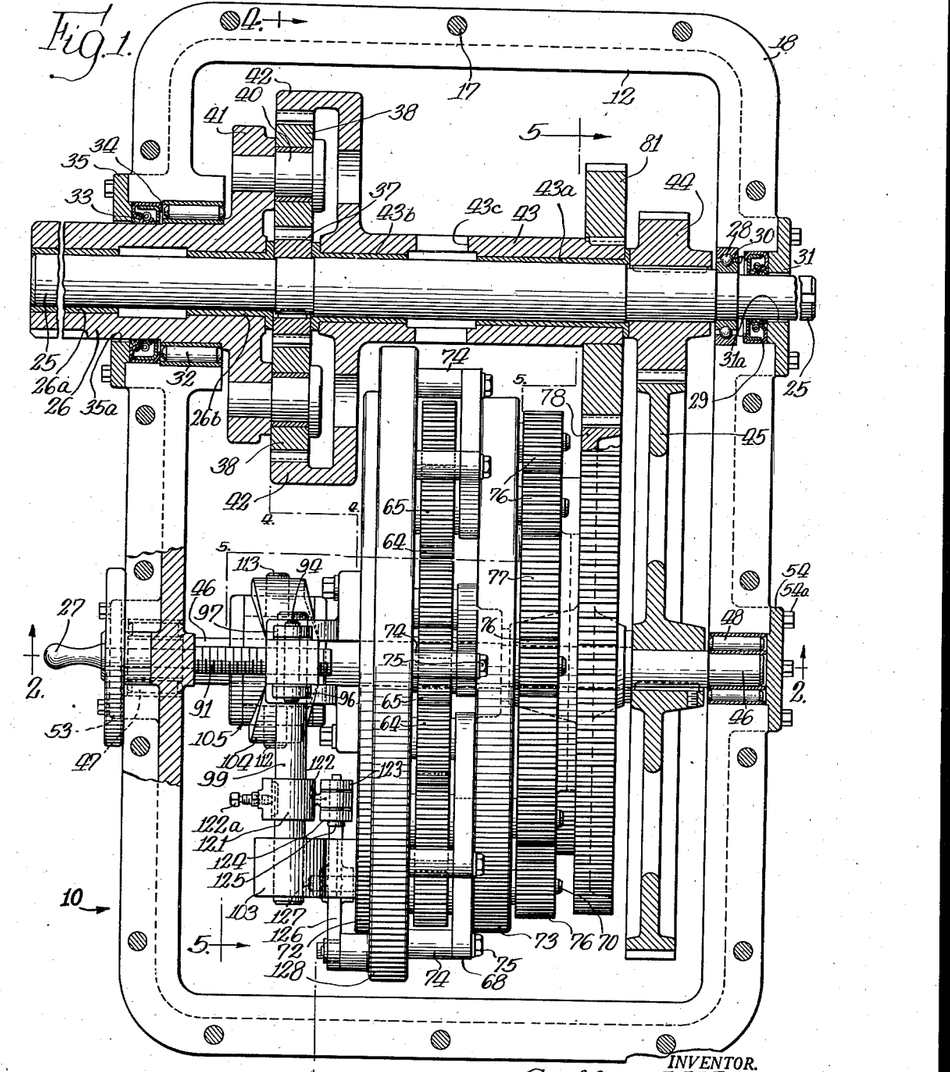
Figure 1 is a horizontal sectional view of the improved power transmission mechanism comprising my invention.
Figures 2, 3:
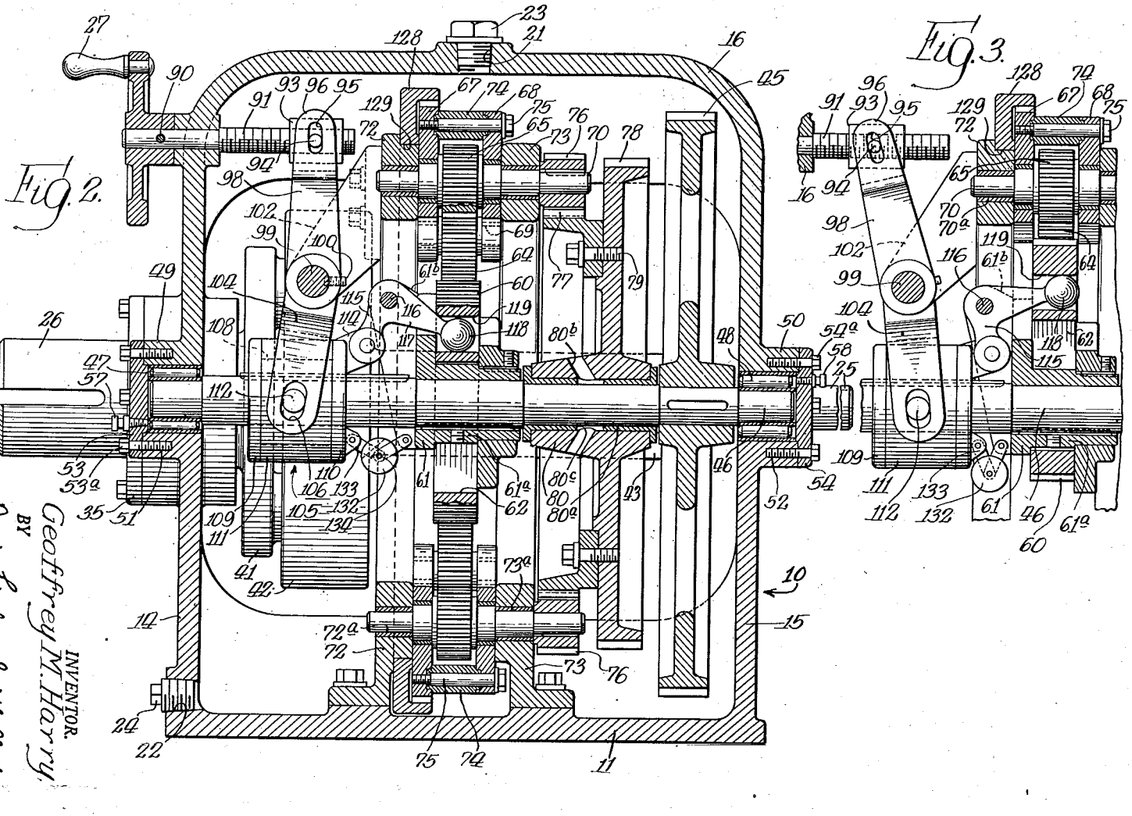
Fig. 2 is a vertical sectional view of the power transmission mechanism taken on the line 2—2 in Fig. 1 looking in the direction of the arrows.
Fig. 3 is a detailed vertical sectional view of the mechanism for adjusting the movable gear to its various eccentric positions and showing the relative positions of the parts of such mechanism with the gear adjusted to eccentric position.
Figure 4:
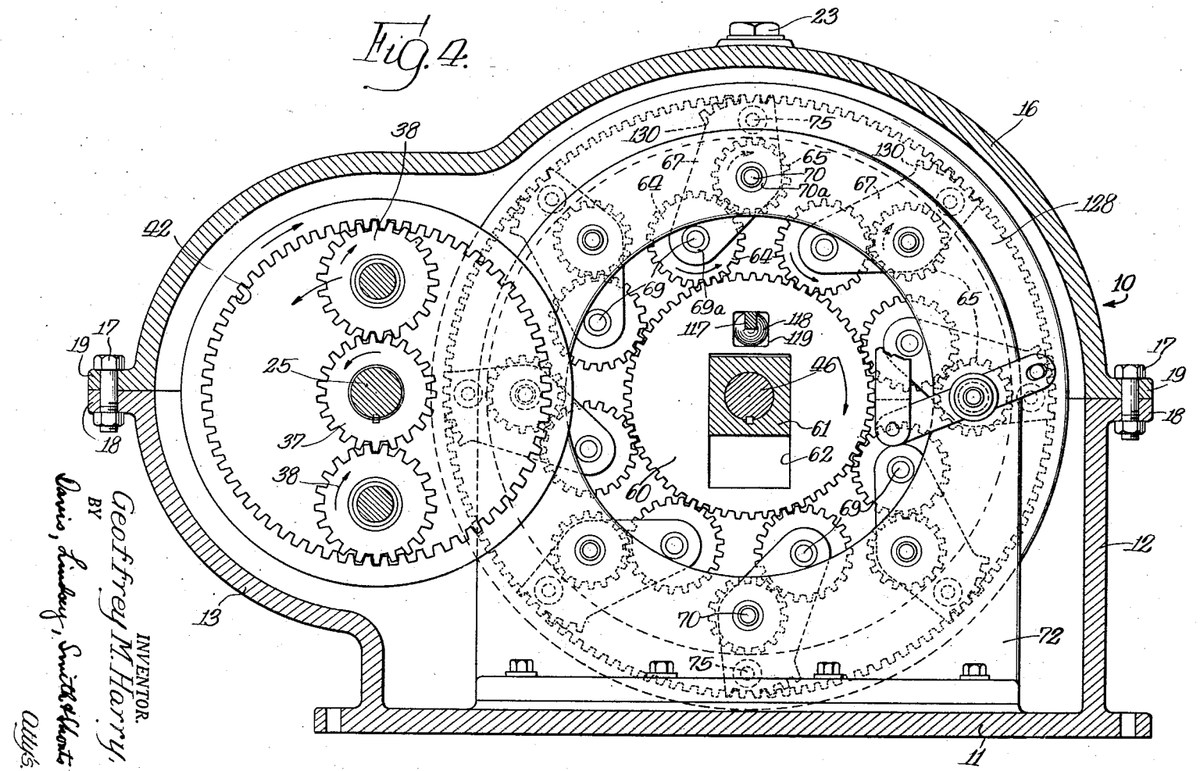
Fig. 4 is a vertical sectional view of the power transmission mechanism taken on the line 4—4 of Fig. 1 looking in the direction of the arrows.

As shown particularly in Figs. 1, 2 and 4 of the drawings, the infinitely variable power transmission mechanism comprising my invention is wholly contained within a casing 10, thereby forming a self-contained sealed device which may be sold as a separate unit and set up adjacent a tool or machine for controlling the speed thereof. The casing 10 comprises a bottom wall 11, a vertical end wall 12, an upwardly extending curved end wall 13, and vertical side walls 14 and 15. A cover plate 16 which completes the casing 10 rests on and is secured to the upper faces of the end and side walls by means of bolts 17 which extend through outwardly directed and abutting flanges 18 and 19 which extend continuously around the upper rim of the end and side walls 12, 13, 14 and 15 and around the lower rim of the cover plate 16, respectively. The cover plate 16 and the end walls 13 are shaped in such a manner as to conform to the mechanism within the casing 10.

The entire power transmission mechanism within the casing 10 may be operated in an oil bath and consequently the cover plate 10 is provided with a centrally located threaded opening 21 through which oil may be poured into the casing 10, and likewise the side wall 14 is provided at the bottom thereof with a threaded opening 22 through which used oil may be drained from the casing. The casing openings 21 and 22 are sealed by screw plugs 23 and 24.

Referring to Figs. 1 and 2 of the drawings, a driving member or input shaft 25 extends transversely of the casing 10 and projects through each of the side walls thereof. An output shaft or driven sleeve 26 which also extends through the side wall 14 of the casing 10 is mounted on the left end of the shaft 25 and is separated therefrom for free and independent rotative movement by bushings 26a and 26b. The input shaft 25 is adapted to be operably engaged for rotative movement at a constant speed with a suitable source of power (not shown) and the output shaft or driven sleeve 26 is adapted to be operably engaged with a machine, tool or the like, which must be operated at a speed at variance with that of the source of power. The variable speed or power transmission mechanism, which will be described in detail hereinafter, operably connects through its train of gears and shafts the input and output shafts 25 and 26 and this transmission mechanism may be adjusted during its operation merely by the turning of a crank handle 27, which is mounted on the outside of the casing 10, so as to vary the speed of the driven sleeve 26 to any infinite degree within a certain range of adjustment.

As shown in Fig. 1, the driving shaft 25 is mounted for rotative movement at its right end in an annular ball bearing member 28 which is set in and supported by the casing wall 15. Adjacent the bearing member 28, an annular oil seal 29 encircles the shaft 25 and serves to prevent the passage of oil from the interior of the casing 10. The opening 30 in the casing 10 through which the right end of the driving shaft 25 extends is closed by a plate member 31 which is bolted to the casing and which also serves to retain the oil seal 29 in proper sealing position. The closure plate 31 has a centrally located aperture 31a through which the end of the shaft 25 projects for operable connection to a source of power. The other end of the driving shaft 25 is received within bushings 26a and 26b and is supported by the driven sleeve 26 which in turn is supported for free rotative movement by roller bearings 32 which are set in and supported by the end wall 14 of the casing 10. An annular oil seal 33 encircles the driven sleeve 26 adjacent the roller bearings 32 and, similarly to oil seal 29, also prevents the passage of oil from the casing 10. The opening 34 in the casing 10 is closed by a plate member 35 which likewise is bolted to the casing 10 and is provided with a centrally located aperture 35a through which the end of the driven sleeve 26 projects for operable connection to the machine or tool to be operated.

Within the casing 10 and operably connecting the driving shaft 25 to the driven sleeve 26 is a planetary gear train comprising a sun gear 37 which is keyed to the driving shaft 25 and constantly in mesh with two diametrically opposed planet gears 38. These planet gears 38 are mounted on short shafts 40 carried by an annular disc member 41 which is integrally formed with the driven sleeve 26 at its inner end and at substantially right angles thereto. The planet gears 38 are also constantly in mesh with an internal or orbit gear 42 which is integrally formed on the left end (as viewed in Fig. 1) of a sleeve member 43. This sleeve member 43 is mounted for free and independent rotative movement on bushings 43a and 43b which are carried on the central portion of the driving shaft 25 within the casing 10. The sleeve member 43 is provided with radial openings 43c to facilitate the passage of oil to the shaft 25 for proper lubrication of the moving parts.

As viewed in Fig. 4, when the shaft 25 is driven in a counterclockwise direction by the source of power, the sun gear 37 likewise is rotated in a counterclockwise direction which causes the planet gears 38 and the internal gear 42 to rotate in a clockwise direction. However, as the planet gears 38 rotate clockwise they are caused to move in a counterclockwise direction in their orbit around the internal gear 42, thereby effecting rotative movement of the disc member 41 and the integrally formed driven sleeve 26 in a counterclockwise direction. Thus, through the above described planetary gear train, counterclockwise movement of the driving shaft 25 effects counterclockwise movement of the driven sleeve 26.

The varying and controlling of the speed of the driven sleeve 26 is accomplished by varying and controlling the speed of the internal gear 42 of the planetary train. For example, if the internal gear 42 were to be constrained against any rotative movement whatsoever, the driving shaft 25 would effect rotative movement of the driven sleeve 26 at its highest rate of speed, since the planet gears 38, upon being rotated by the sun gear 37, would have a stationary gear member 42 to work back against so as to move, therefore, at their highest rate of speed in a counterclockwise direction (as viewed in Fig. 4) about the sun gear 37 and within the internal gear 42. In other words, with the internal gear stationary, none of the speed of movement of the planet gears 38 around the internal gear 42 would be lost, as is the case when rotative movement of the internal gear 42 in the same direction of rotative movement of the planet gears 38 is permitted. Consequently, if the internal gear 42 is caused to rotate in a clockwise direction at a relatively slow rate of speed, the driven sleeve 26 will be caused to rotate in a clockwise direction at a relatively high rate of speed. And, thus, as the rate of rotation of the internal gear 42 in a clockwise direction is increased, the rate of speed of rotation of the driven sleeve 26 will be decreased proportionately as a consequence. Conversely, as the rate of rotation of the internal gear 42 is decreased, the rate of rotation of the driven sleeve 26 will be increased. Should the speed of rotation of the internal gear 42 be increased to very high degrees, the planet gears 38 may be caused to remain stationary in their orbit or even to move in a clockwise direction and thereby causing rotative movement of the driven shaft 26 in a clockwise or reverse direction. The rate of rotation of the internal gear 42 is controlled by the following mechanism which will now be described.

As shown more particularly in Figs. 1 and 2 of the drawings, a pinion 44 is keyed to the driving shaft 25 between the right end of the sleeve 43 and the casing side wall 15 and meshes with a large gear 45 keyed to a rotatable shaft 46. The shaft 46 extends transversely of the casing 10 in parallel relationship to the driving shaft 25 and in substantially the same plane therewith as shown in Fig. 2. Each end of the shaft 46 is mounted for rotative movement in roller bearings 47 and 48 which are retained in annular openings in the casing 10 formed by semi-circular portions 49 and 50 of the cover plate flange 19 and by complemental semi-circular portions 51 and 52 of the end wall flange 18. Annular closure plates 53 and 54 which serve to maintain the roller bearings 47 and 48 in proper operative position and also to close the annular casing openings are bolted to the casing 10 by bolts 53a and 54a. The roller bearings 47 and 48 are provided with grease nipples 57 and 58, respectively, which extend through the closure plates 53 and 54.

Mounted on the rotatable shaft 46 substantially centrally of its ends is a gear 60 (Figs. 1, 2 and 4) which is adapted to be moved radially or outwardly from concentric position, as shown in Fig. 4, with respect to the shaft 46 to eccentric position and return so as to effect (in a manner to be fully described hereinafter) an increase or a decrease in the rate of rotation of the internal gear 42. This eccentrically movable gear 60 is slidably mounted on a rotatable supporting member 61 having a portion 61a of rectangular cross-section which is received within an elongated rectangular opening 62 extending through the body portion of the gear 60 for sliding engagement therewith. The supporting member 61 is keyed to the shaft 46 so that the gear 60 is caused to rotate upon rotation of the shaft 46.

The eccentrically slidable gear 60 in its concentric position, shown clearly in Fig. 4, is in mesh with eight smaller gears 64 which in turn mesh with eight still smaller gears 65. Each of the gears 64 and 65 is carried by and between rockable bracket members 67 and 68, the gears 64 being made integral with short shafts 69 extending between the rockable brackets 67 and 68 and the gears 65 being made integral with relatively longer rotatable shafts 70 which extend between and through the brackets 67 and 68 The shafts 70 are supported outside of the rockable brackets 67 and 68 by a pair of standard plates 72 and 73 which are bolted to the bottom wall 11 of the casing 10 and extend vertically in parallel relation with each other to a point spaced somewhat below the cover plate 16 The shafts 69 and 70 are adapted to run freely in bushings 69a and 70a, respectively, in the brackets 67 and 68, and the shafts 70 also run freely in bushings 72a and 73a in the standard plates 72 and 73 The outer ends of each of the eight pairs of rockable brackets 67 and 68 are maintained in properly spaced relationship by spacing members 74, the brackets 67, 68 and their respective spacing members 74 being secured together by bolts 75 extending therethrough.

Keyed on the right ends (as viewed in Figs 1 and 2) of each of the eight rotatable shafts 70 are pinions 76, each of which is in constant mesh at all times with a common gear 77 which is secured to the inner face of a relatively larger gear 78 by means of bolts 79. The gear 77 may be integral with gear 78, if desired. The gear 78 is integrally formed as a part of a sleeve or hub 80 which is mounted on a bushing 80a on the rotatable shaft 46 for free rotatable movement independently of said shaft. The hub 80 is provided with diagonal openings 80b leading to openings 80c in the bushing 80a to facilitate the passage of oil to the shaft 46 for proper lubrication of the moving parts. The gear 78, as shown clearly in Fig. 1, is likewise in constant mesh with a gear 81 which is carried by and keyed to the right end of the sleeve 43 which rotates on the driving shaft 25.

Thus, by the above described gear train, rotative movement of the driving shaft 25 effects controlled rotative movement of the internal or orbit gear 42 of the planetary gear train. To summarize, the driving force of the driving shaft 25 is transmitted through the pinion 44, the gear 45, the eccentrically movable gear 60, the gears 64, the gears 65, the pinions 76, the gear 77, the gear 78, the gear 81, the sleeve 43 and finally to the internal gear 42. With the gear 60 in its normal concentric position illustrated in Fig. 4 of the drawings, the internal gear 42 is driven at its slowest rate of speed with the result that the driven sleeve 26 is caused to rotate at its highest rate of speed.

Figure 5:
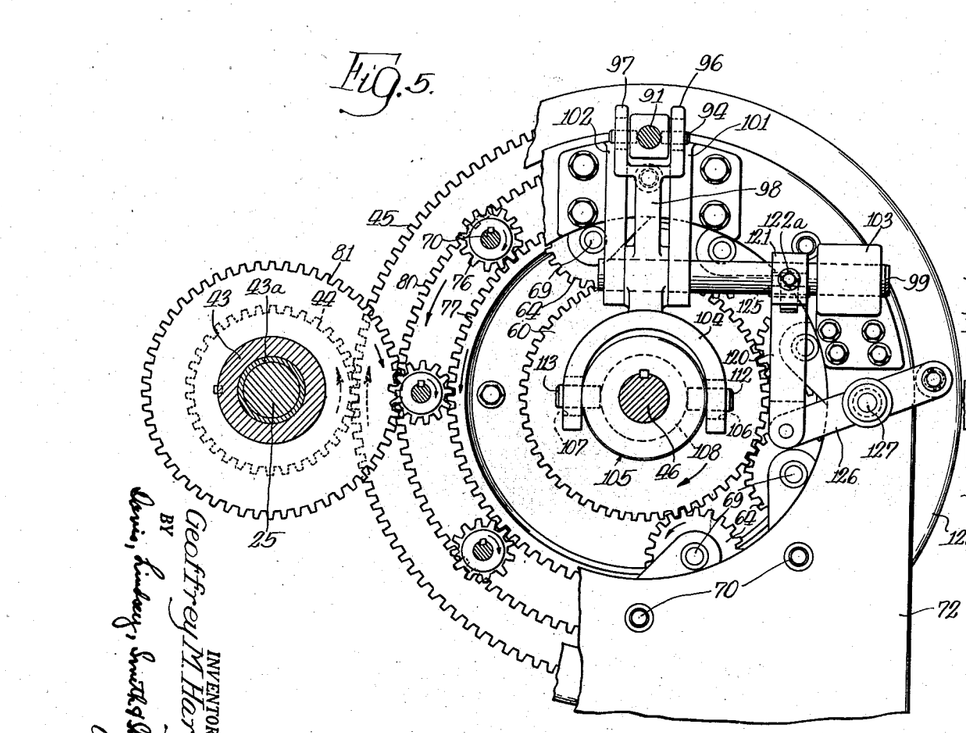
Fig. 5 is a vertical sectional view of the mechanism taken on the line 5—5 of Fig. 1 looking in the direction of the arrows.
Figure 6:
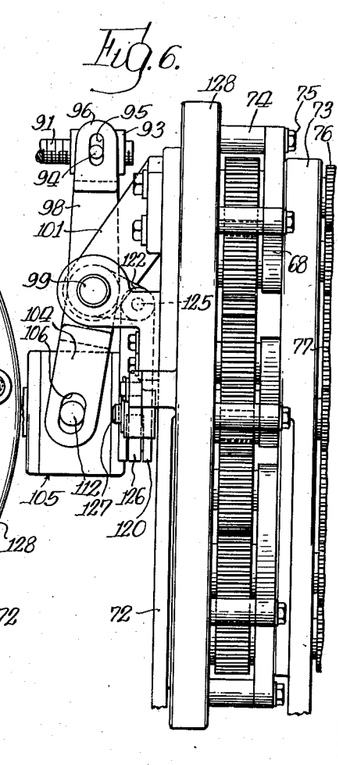
Fig. 6 is a side view of the mechanism illustrated in Fig. 5 as viewed from the right.

If, however, it is desired to reduce the rate of speed of the driven sleeve 26, the rate of speed of the internal gear 42, as explained hereinbefore, is correspondingly increased by outward movement of the gear 60 to eccentric position with respect to the shaft 46. Outward movement of the gear 60 to eccentric position is accomplished by turning the crank handle 27. The operating handle 27 is secured by means of a set screw 90 to the outer end of an adjusting screw 91 which extends within the casing 10 through the upper side of the cover plate 16. Threadedly engaged with the adjusting screw 91 adjacent its inner end, is a nut 93 having laterally extending pins 94 on each side thereof which are received within elongated vertical slots 95 in the upwardly directed arms 96 and 97 of a bifurcated lever member 98. The lever 98 is secured to a rock shaft 99 by a set screw 100, the rock shaft 99 being supported for free rotative movement at its left end, as viewed in Fig. 5, by bearing members 101 and 102 and at its other end by a bearing member 103, which bearing members 101, 102 and 103 are bolted to the outer side of the upright standard plate 72.

The lower end of the lever 98 is provided with a semi-circular bifurcated end portion 104 which straddles a slidable collar 105. Each of the ends of the semi-circular portion 104 of the lever 98 is provided with elongated slots 106 and 107, respectively. The slidable collar 105 is comprised of a central body portion 108, which is slidably keyed to the shaft 46 for rotative movement therewith and provided at its ends with integral upstanding annular flanges 109 and 110 also encircling the shaft 46. The body portion 108 and its end flanges 109 and 110 form a structure resembling a spool adapted for rotative movement with the shaft 46 and also for slidable axial movement thereon. Encircling the central body portion 108 of the collar 105 and confined between its end flanges 109 and 110 is a split ring member 111 which is independent of and unaffected by rotative movement of the body portion 108 which is free to rotate within the ring member 111. The split ring member 111 is provided with laterally projecting pins 112 and 113 which are received within the elongated slots 106 and 107, respectively, of the ends of the lever 98.

The upstanding end flange 110 of the slidable collar 105 is provided with a forwardly directed arm 114 to which is pivotally connected the downwardly extending arm of a bell crank lever 115. This lever 115 is pivotally supported on a pivot pin 116 extending between two projecting ears 61b of the gear supporting member 61, and has a forwardly directed arm 117 having an enlarged ball-like end 118 which is received within a square opening or socket 119 extending through the gear 60. The square opening 119 and the rectangular slide opening 62 are in alignment and are located on substantially the same diameter of the gear 60.

Movement of the gear 60 to an eccentric position is accomplished by operation of the foregoing mechanism. To this end, the operator may rotate the crank handle 27 so as to cause the nut 93 to move toward the handle 27 along the screw 91. The upper bifurcated arms 96 and 97 likewise are caused to move with the nut 93 so as to rock the lever 98 in a counterclockwise direction, as viewed in Fig. 2. This counterclockwise movement causes the lower semi-circular portion 104 of the lever 98 to move forwardly and slide the collar 105 axially toward the gear 60 along the shaft 46 which in turn rocks the bell crank lever 115 in a counterclockwise direction about its pivot 116. This movement causes the ball-like end 118 to be raised or move away from the shaft 46, thereby forcing the movable gear 60 to slide upwardly on its supporting slide block 61a in a direction outwardly from the shaft 46 to an eccentric position clearly shown in Fig. 7 of the drawings.

In order to compensate for the transposition of the mass of the gear 60 to eccentric position and thus provide for a balanced drive, there is provided a counterbalance 132 which is pivotally supported by pairs of arms 133 and 134 pivotally connected to the end portion 110 of the sliding collar 105 and the lower end of the projecting ears 61b of the gear supporting member 61, respectively. With the foregoing arrangement, as the sliding collar 105 moves to the right, as viewed in Fig. 2, so as to effect movement of the gear 60 to outward eccentric position away from the shaft 46, the counterbalance 132 also is moved in the opposite direction away from the shaft 46 a proportionate distance.

Simultaneously with the movement of the gear 60 to an eccentric position, the eight smaller gears 64, all of which are in meshing engagement with the gear 60 when that gear is in concentric position, are also caused to be moved outwardly in substantially radial directions away from the shaft 46. Since all the gears 64 move outwardly in all directions away from the shaft 46, some of these gears 64 will pull away from meshing engagement with the eccentric gear 60, the number of gears 64 in meshing engagement with the gear 60 becoming more reduced in number as the gear 60 continues to move toward its extreme eccentric position. However, while moving to and while in eccentric position, the gear 60 is in mesh with one or more of the gears 64 at all times, as will be more fully explained hereinafter.

Movement of the gears 64 to their outward positions also occurs as the crank handle 27 is rotated by the operator. When the lever 98 is rocked counterclockwise as viewed in Fig. 2, the rock shaft 99 also rocks in a counterclockwise direction, causing a link 120, which is pivotally connected at its upper end to a lever 121, to move upwardly, as viewed in Figs. 1 and 5. In detail, the lever 121 has a laterally extending arm 122 which extends between the upwardly directed bifurcated ends 123 and 124 of the link 120, these bifurcated ends 123 and 124 and the arm 122 being pivotally connected by means of a pivot pin 125 extending through said elements. The lower end of the link 120 is pivotally connected to the left end of a lever 126 which is pivotally supported intermediate its ends on a short shaft 127 projecting outwardly from the upright standard plate 72. The right end (as viewed in Fig. 5) of the lever 126 is pivotally secured to an internal ring gear 128 which is mounted for limited circumferential sliding movement on an annular shoulder 129 of the upright standard plate 72. By the foregoing arrangement of parts, therefore, as the link 120 moves upwardly from rotation of the handle 27, the lever 126 turns in a clockwise direction about its pivot 127, thereby forcing the internal gear 128 to move in a clockwise direction.

Figure 7:
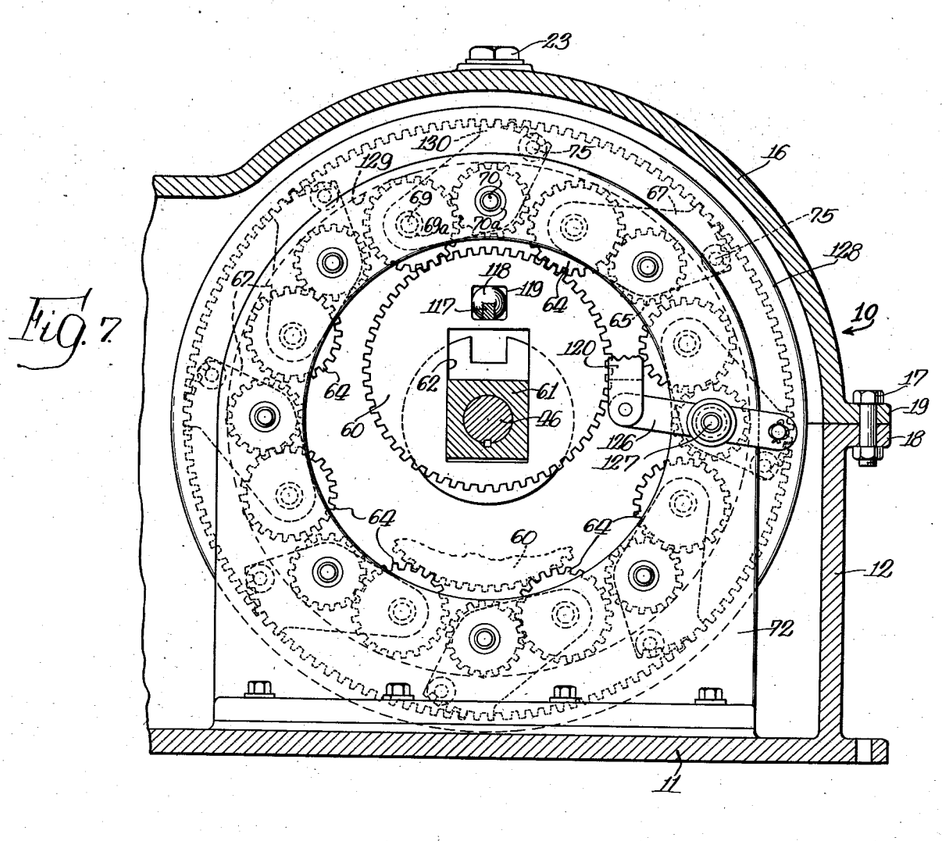
Fig. 7 is a vertical sectional view similar to that of Fig. 4 but illustrating the eccentrically movable gear and the smaller rockable gears in an eccentrically adjusted position.

The upper or outward end portions of each of the brackets 67 are in the form of segments having gear teeth 130 which are in constant mesh with the teeth of the internal ring gear 128. Thus, as the ring gear 128 moves in a clockwise direction, as viewed in Fig. 4, the brackets 67 and 68 are also rocked in a clockwise direction about their respective pivot points or shafts 70, thereby causing all the gears 64 to move outwardly in a substantially radial direction away from the shaft 46 to their outward positions illustrated in Fig. 7. Thus, the operator by the single act of turning the handle 27 the proper amount causes the gear 60 to move to the eccentric position desired and simultaneously causes the eight gears 64 also to move away to their outwardly adjusted positions, one or more of which remain in meshing engagement with the gear 60 during this adjusting movement, as illustrated in Fig. 7.

By moving the gear 60 in one radial direction to adjusted eccentric position, its effective radius is thereby increased and in operation it is equivalent to a larger concentric gear capable of driving at a higher rate of speed. As shown in Fig. 7, with the gears 64 and the gear 60 in eccentrically adjusted position, rotation of the shaft 46, as above described, in a clockwise direction causes the gear 60, which is now an eccentric, also to rotate clockwise. As it so rotates in a clockwise direction, the gear 60 engages one or more of the gears 64 and drives them in a counterclockwise direction. Upon continued clockwise movement, the gear 60 progressively breaks off meshing engagement with certain of the gears 64 and successively goes into meshing engagement with the next succeeding gears 64. The gear 60 is always in driving engagement with one or more gears 64 and before driving engagement with one gear 64 is broken off the gear 60 is in definite driving engagement with the next succeeding gear 64 in clockwise order.

Since at least one of the gears 64 is always in driving contact with the eccentric gear 60, all of the gears 64, including those out of meshing engagement with the gear 60, are also caused to rotate at the same rate of speed as will be explained later. This permits the eccentric gear to pick up and become engaged with the next succeeding gear 64 without clashing since its speed of rotation is synchronized with the speed of rotation of the gear 60. Rotation of all the gears 64 is effected through the common gear 77. For instance, if only one gear 64 is in meshing engagement with the eccentric gear 60, the driving force is transmitted from the eccentric gear 60, to the one engaged gear 64, to its one meshing gear 65 which drives one pinion 76 through the one shaft 70. Driving rotation of the one pinion 76 causes rotation of the large gear 77 with the result that all the other pinions 76 are caused to rotate thereby driving all the other gears 64 back through the other shafts 70 and the other gears 65.

When the gear 60 has been adjusted to eccentric position so as to increase its effective radius, the gears 64 are therefore caused to rotate at a higher rate of speed than when the gear 60 was concentric. The increase of the rate of speed of the gears 64 accordingly increases the speed of rotation of all the gears in the gear train thereafter including the gears 65, the pinions 76, the gear 77, the gear 81, the sleeve 43 and finally the internal gear 42. By the increase of speed of rotation of the internal gear 42, as set forth in detail hereinabove, the resultant speed of rotation of the driven sleeve 26 is lowered proportionately to the desired rate dictated by the machine or tool being operated or the work being done. Thus, the greater the extent of eccentricity of the gear 60 with respect to the shaft 46, the greater will be the speed of rotation of the internal gear 42 and the lower will be the speed of the driven sleeve 26. Conversely, as the gear 60 moves toward its concentric position, the speed of rotation of the internal gear 42 is correspondingly lowered and the resultant speed of rotation of the driven sleeve 26 is correspondingly higher. The highest output speed of the driven sleeve 26 results when the gear 60 is in concentric position on the shaft 46 since at this time the internal gear 42 is being driven at its lowest rate of speed.

Thus, merely by rotation of the crank handle 27 which projects outside of the casing 10, the operator may, even during machine operation without stoppage or disconnection of the mechanism, adjust the speed of rotation of the driven sleeve 26 to any infinitesimal amount within a given range of adjustment. The adjustment is not limited to certain steps, rates or variations of speed as is the case when separate larger or smaller gears are injected into a gear train or when stepped cone gears and the like are employed. By sliding the gear 60 upwardly on the supporting block 61 any infinite amount, the speed of the driven sleeve 26 may be correspondingly reduced an infinite amount. The speed changing structure of the present invention is, therefore, infinitely variable with a given range of adjustment.

Also, as described, the unit is sealed, self-contained and capable of a long operable life. The unit is an all-gear device employing gears and parts of standard sizes and makes, with the result that it is relatively inexpensive and simple in manufacture and assembly. It is also compact and may be manufactured and sold as a separate unit for application to machines and mechanisms presently in use without the necessity of modification of those machines or mechanisms in any way. In addition, in order to make the adjustment, no particular skill is required on the part of the operator since all that is required is the turning of the crank handle 27. Thus, the cover plate need not be removed at any time for speed adjustments. Also with the gear parts operating in an oil bath the wear on the parts is reduced to a minimum.

It is also to be noted that by the foregoing all-gear infinitely variable speed changing transmission there is little or no loss of power when the driven sleeve 26 is put under load. When the load is applied to the driven sleeve 26, a reaction occurs which tends to drive the internal gear 42 and the other gears in the gear train back to the driving shaft 25 so as to drive it in the same direction as the source of power. This reaction under load, therefore, tends to drive the driving shaft 25 in the same direction in which the source of power drives it so that power is tended to be put back into or returned to the driving shaft 25. Consequently, the loss of power through the speed control mechanism has been reduced to a minimum.

Although one form of infinitely variable speed changing transmission has been described hereinbefore with reference to the accompanying drawings, it is to be understood that modifications and variations in structure may be made without departing from the spirit and scope of my invention as defined in the appended claims. The speed changing mechanism comprising the eccentrically movable gear 60, the rockable gears 64, etc., may be applied with like effect to other gear arrangements or to the other gears of the planetary train where the planetary train is connected in a different operative arrangement with the driving shaft 25 and the driven shaft 26. For instance, by proper modification of the parts, the internal gear could be made the driving member of the planetary train and thus connected directly with the driving shaft 26, and the sun gear could be the gear member of the planetary train whose rate of speed would be controlled by the eccentrically movable gear 60. The arrangement could also be varied in a similar respect with regard to the planet gears of the train.

What is claimed is:

1. An infinitely variable speed power transmission mechanism comprising a driving shaft, a driven shaft, a planetary gear train operably connecting the driving shaft with the driven shaft and having three types of gears comprising a sun gear, an internal orbit gear and a plurality of planet gears in meshing engagement with said sun gear and said internal gear, one of said type of gears being the driving element of the train and another of said type of gears being the driven element of the train, and means for varying the speed of movement of the third type of gear of the train to effect a variation in the speed of rotation of the driven shaft, comprising a rotatable shaft, means operably connecting said driving shaft and said rotatable shaft for effecting rotation of said rotatable shaft, an eccentrically movable gear mounted on said rotatable shaft for rotative movement therewith and adapted to be moved relative to said rotatable shaft from concentric to eccentric position and return, a plurality of gears disposed in spaced relation around the movable gear and adapted to mesh with said movable gear in its concentric and eccentric positions and means for operably connecting said plurality of gears in driving relation to said third type of gear of the planetary train.

2. An infinitely variable speed power transmission mechanism comprising a driving shaft, a driven shaft, a planetary gear train operably connecting the driving shaft with the driven shaft and having three types of gears comprising a sun gear, an internal orbit gear and a plurality of planet gears in meshing engagement with said sun gear and said internal gear, one of said type of gears being the driving element of the train and other of said type of gears being the driven element of the train, and means for varying the speed of movement of the third type of gear of the train to effect a variation in the speed of rotation of the driven shaft, comprising a rotatable shaft, means operably connecting said driving shaft and said rotatable shaft for effecting rotation of said rotatable shaft, an eccentrically movable gear mounted on said rotatable shaft for rotative movement therewith and adapted to be moved relative to said rotatable shaft from concentric to eccentric position and return, a plurality of gears disposed in spaced relation around the movable gear and adapted to mesh with said movable gear in its concentric and eccentric positions, said plurality of gears being adapted for outward movement away from said rotatable shaft, means for moving said movable gear to various eccentric positions, means for moving said plurality of gears outwardly away from said rotatable shaft, and means for operably connecting said plurality of gears in driving relation to said third type of gear of the planetary train.

3. An infinitely variable speed power transmission mechanism comprising a driving shaft, a driven shaft, a planetary gear train operably connecting the driving shaft with the driven shaft and having three types of gears comprising a sun gear, an internal orbit gear and a plurality of planet gears in meshing engagement with said sun gear and said internal gear, one of said type of gears being the driving element of the train and another of said type of gears being the driven element of the train, and means for varying the speed of movement of the third type of gear of the train to effect a variation in the speed of rotation of the driven shaft, comprising a rotatable shaft, means operably connecting said driving shaft and said rotatable shaft for effecting rotation of said rotatable shaft, an eccentrically movable gear mounted on said rotatable shaft for rotative movement therewith and adapted to be moved relative to said rotatable shaft from concentric to eccentric position and return, a plurality of gears disposed in spaced relation around the movable gear and adapted to mesh with said movable gear in its concentric and eccentric positions, said plurality of gears being adapted for outward movement away from said rotatable shaft, means for moving simultaneously said plurality of gears outwardly away from said rotatable shaft and said movable gear to eccentric position, and means for operably connecting said plurality of gears in driving relation to said third type of gear of the planetary train.

4. An infinitely variable speed power transmission mechanism comprising a driving shaft, a driven shaft, a planetary gear train operably connecting the driving shaft with the driven shaft and having three types of gears comprising a sun gear, an internal orbit gear and a plurality of planet gears in meshing engagement with said sun gear and said internal gear, one of said type of gears being the driving element of the train and another of said type of gears being the driven element of the train, and means for varying the speed of movement of the third type of gear of the train to effect a variation in the speed of rotation of the driven shaft, comprising a rotatable shaft, means operably connecting said driving shaft and said rotatable shaft for effecting rotative movement of said rotatable shaft, an eccentrically movable gear mounted on said rotatable shaft for rotative movement therewith and adapted to be moved relative to said rotatable shaft from concentric to eccentric position and return, a plurality of gears disposed in spaced relation around the movable gear and adapted for outward movement away from said rotatable shaft, all of said plurality of gears being adapted to mesh with said movable gear when said movable gear is in concentric position and one or more of said plurality of gears being adapted when in outward position to mesh with said movable gear when said gear rotates in its eccentric position, and means for operably connecting said plurality of gears in driving relation to said third type of gear of the planetary train.

5. An infinitely variable speed power transmission mechanism comprising a driving shaft, a driven shaft, a planetary gear train operably connecting the driving shaft with the driven shaft and having three types of gears comprising a sun gear, an internal orbit gear and a plurality of planet gears in meshing engagement with said sun gear and said internal gear, one of said type of gears being the driving element of the train and another of said type of gears being the driven element of the train, and means for varying the speed of movement of the third type of gear of the train to effect a variation in the speed of rotation of the driven shaft, comprising a rotatable shaft, means operably connecting said driving shaft and said rotatable shaft for effecting rotative movement of said rotatable shaft, an eccentrically movable gear mounted on said rotatable shaft for rotative movement therewith and adapted to be moved relative to said rotatable shaft from concentric to eccentric position and return, a plurality of gears disposed in spaced relation around the movable gear and adapted for outward movement away from said rotatable shaft, all of said plurality of gears being adapted to mesh with said movable gear when said movable gear is in concentric position and one or more of said plurality of gears being adapted when in outward position to mesh with said movable gear when said gear rotates in its eccentric position, common gear means operably connected with each of said plurality of gears and adapted to be driven by those of said plurality of gears in meshing engagement with said movable gear and to drive those of said plurality of gears out of meshing engagement when said gears are in outward adjusted position, and means operably connecting said common gear means in driving relation to said third type of gear of the planetary train.

6. An infinitely variable speed power transmission mechanism comprising a driving shaft, a driven shaft, a planetary gear train operably connecting the driving shaft with the driven shaft and having three types of gears comprising a sun gear, an internal orbit gear and a plurality of planet gears in meshing engagement with said sun gear and said internal gear, one of said type of gears being the driving element of the train and another of said type of gears being the driven element of the train, and means for varying the speed of movement of the third type of gear of the train to effect a variation in the speed of rotation of the driven shaft, comprising a rotatable shaft, means operably connecting said driving shaft and said rotatable shaft for effecting rotative movement of said rotatable shaft, an eccentrically movable gear mounted on said rotatable shaft for rotative movement therewith and adapted to be moved relative to said rotatable shaft from concentric to eccentric position and return, a plurality of gears disposed in spaced relation around the eccentrically movable gear and adapted to mesh with said movable gear as it rotates in its concentric and eccentric positions, rockable means for supporting said plurality of gears and adapted upon rocking movement to move said plurality of gears outwardly away from the point of rotation of said eccentrically movable gear and return, means for rocking said rockable members to outward position and return upon movement of the eccentrically movable gear to eccentric position and return, and means for operably connecting said plurality of gears in driving relation to said third type of gear of the planetary train.

7. An infinitely variable speed power transmission mechanism comprising a driving shaft, a driven shaft, a planetary gear train operably connecting the driving shaft with the driven shaft and having three types of gears comprising a sun gear, an internal orbit gear and a plurality of planet gears in meshing engagement with said sun gear and said internal gear, one of said type of gears being the driving element of the train and another of said type of gears being the driven element of the train, and means for varying the speed of movement of the third type of gear of the train to effect a variation in the speed of rotation of the driven shaft, comprising a rotatable shaft, means for rotating said shaft at a constant rate of speed, an eccentrically movable gear mounted on said rotatable shaft for rotative movement therewith and adapted to be moved relative to said rotatable shaft from concentric to eccentric position and return, a plurality of gears disposed in spaced relation around the movable gear and adapted to mesh with said movable gear in its concentric and eccentric positions and means for operably connecting said plurality of gears in driving relation to said third type of gear of the planetary train.

8. An infinitely variable speed power transmission mechanism comprising a driving shaft, a driven shaft, a planetary gear train operably connecting the driving shaft with the driven shaft and comprising a sun gear driven by the driving shaft, an internal orbit gear, and a plurality of planet gears in meshing engagement with said sun gear and said internal gear and operably connected with the driven shaft, and means for varying the speed of movement of the internal gear of the planetary train to effect a variation in the speed of rotation of the driven shaft, comprising a rotatable shaft, means operably connecting said driving shaft and said rotatable shaft for effecting rotation of said rotatable shaft, an eccentrically movable gear mounted on said rotatable shaft for rotative movement therewith and adapted to be moved relative to said rotatable shaft from concentric to eccentric position and return, a plurality of gears disposed in spaced relation around the movable gear and adapted to mesh with said movable gear in its concentric and eccentric positions, and means for operably connecting said plurality of gears in driving relation to said internal gear of the planetary train.

9. An infinitely variable speed power transmission mechanism comprising a driving shaft, a driven shaft, a planetary gear train operably connecting the driving shaft with the driven shaft and comprising a sun gear driven by the driving shaft, an internal orbit gear, and a plurality of planet gears in meshing engagement with said sun gear and said internal gear and operably connected with the driven shaft, and means for varying the speed of movement of the internal gear of the planetary train to effect a variation in the speed of rotation of the driven shaft, comprising a rotatable shaft, means operably connecting said driven shaft and said rotatable shaft for effecting rotation of said rotatable shaft, an eccentrically movable gear mounted on said rotatable shaft for rotative movement therewith and adapted to be moved relative to said rotatable shaft from concentric to eccentric position and return, a plurality of gears disposed in spaced relation around the movable gear and adapted to mesh with said movable gear in its concentric and eccentric positions, said plurality of gears being adapted for outward movement away from said rotatable shaft, means for moving said movable gear to various eccentric positions, means for moving said plurality of gears outwardly away from said rotatable shaft, and means for operably connecting said plurality of gears in driving relation to said internal gear of the planetary train.

10. An infinitely variable speed power transmission mechanism comprising a driving shaft, a driven shaft, a planetary gear train operably connecting the driving shaft with the driven shaft and comprising a sun gear driven by the driving shaft, an internal orbit gear, and a plurality of planet gears in meshing engagement with said sun gear and said internal gear and operably connected with the driven shaft, and means for varying the speed of movement of the internal gear of the planetary train to effect a variation in the speed of rotation of the driven shaft, comprising a rotatable shaft, means operably connecting said driving shaft and said rotatable shaft for effecting rotation of said rotatable shaft, an eccentrically movable gear mounted on said rotatable shaft for rotative movement therewith and adapted to be moved relative to said rotatable shaft from concentric to eccentric position and return, a plurality of gears disposed in spaced relation around the movable gear and adapted to mesh with said movable gear in its concentric and eccentric positions, said plurality of gears being adapted for outward movement away from said rotatable shaft, means for moving simultaneously said plurality of gears outwardly away from said rotatable shaft and said movable gear to eccentric position, and means for operably connecting said plurality of gears in driving relation to said internal gear of the planetary train.

11. An infinitely variable speed power transmission mechanism comprising a driving shaft, a driven shaft, a planetary gear train operably connecting the driving shaft with the driven shaft and comprising a sun gear driven by the driving shaft, an internal orbit gear, and a plurality of planet gears in meshing engagement with said sun gear and said internal gear and operably connected with the driven shaft, and means for varying the speed of movement of the internal gear of the planetary train to effect a variation in the speed of rotation of the driven shaft, comprising a rotatble shaft, means operably connecting said driving shaft and said rotatable shaft for effecting rotation of said rotatable shaft, an eccentrically movable gear mounted on said rotatable shaft for rotative movement therewith and adapted to be moved relative to said rotatable shaft from concentric to eccentric position and return, a plurality of gears disposed in spaced relation around the movable gear and adapted for outward movement away from said rotatable shaft, all of said plurality of gears being adapted to mesh with said movable gear when said movable gear is in concentric position and one or more of said plurality of gears being adapted when in outward position to mesh with said movable gear when said gear rotates in an eccentric position, and means for operably connecting said plurality of gears in driving relation to said internal gear of the planetary train.

12. An infinitely variable speed power transmission mechanism comprising a driving shaft, a driven shaft, a planetary gear train operably connecting the driving shaft with the driven shaft and comprising a sun gear driven by the driving shaft, an internal orbit gear, and a plurality of planet gears in meshing engagement with said sun gear and said internal gear and operably connected with the driven shaft, and means for varying the speed of movement of the internal gear of the planetary train to effect a variation in the speed of rotation of the driven shaft, comprising a rotatable shaft, means operably connecting said driving shaft and said rotatable shaft for effecting rotation of said rotatable shaft, an eccentrically movable gear mounted on said rotatable shaft for rotative movement therewith and adapted to be moved relative to said rotatable shaft from concentric to eccentric position and return, a plurality of gears disposed in spaced relation around the movable gear and adapted for outward movement away from said rotatable shaft, all of said plurality of gears being adapted to mesh with said movable gear when said movable gear is in concentric position and one or more of said plurality of gears being adapted when in outward position to mesh with said movable gear when said gear rotates in an eccentric position, common gear means operably connected with each of said plurality of gears and adapted to be driven by those of said plurality of gears in meshing engagement with said movable gear and to drive those of said plurality of gears out of meshing engagement when said gears are in outward adjusted position, and means operably connecting said common gear means in driving relation to said internal gear of the planetary train.

13. An infinitely variable speed power transmission mechanism comprising a driving shaft, a driven shaft, a planetary gear train operably connecting the driving shaft with the driven shaft and comprising a sun gear driven by the driving shaft, an internal orbit gear, and a plurality of planet gears in meshing engagement with said sun gear and said internal gear and operably connected with the driven shaft, and means for varying the speed of movement of the internal gear of the planetary train to effect a variation in the speed of rotation of the driven shaft, comprising a rotatable shaft, means operably connecting said driving shaft and said rotatable shaft for effecting rotation of said rotatable shaft, an eccentrically movable gear mounted on said rotatable shaft for rotative movement therewith and adapted to be moved relative to said rotatable shaft from concentric to eccentric position and return, a plurality of gears disposed in spaced relation around the eccentrically movable gear and adapted to mesh with said movable gear as it rotates in its concentric and eccentric positions, rockable means for supporting said plurality of gears and adapted upon rocking movement to move said plurality of gears outwardly away from the point of rotation of said eccentrically movable gear and return, means for rocking said rockable members to outward position and return upon movement of the eccentrically movable gear to eccentric position and return, and means for operably connecting said plurality of gears in driving relation to said internal gear of the planetary train.

14. An infinitely variable speed transmission adapted to operably connect a driving member and a driven member comprising an eccentrically movable gear operably connected with said driving member for rotative movement and adapted to be moved from concentric position to eccentric position and return, a plurality of gears disposed in spaced relation around the eccentrically movable gear and adapted to mesh with said movable gear as it rotates in its concentric and eccentric positions, and means for operably connecting said plurality of gears in driving relation to the driven member.

15. An infinitely variable speed transmission adapted to operably connect a driving member and a driven member comprising an eccentrically movable gear operably connected with said driving member for rotative movement and adapted to be moved from concentric position to eccentric position and return, a plurality of gears disposed in spaced relation around the eccentrically movable gear and adapted to mesh with said movable gear as it rotates in its concentric and eccentric positions, said plurality of gears being adapted for outward movement away from the point of rotation of said movable gear, means for moving said movable gear to various eccentric positions, means for moving said plurality of gears outwardly away from said center of rotation of said movable gear, and means for operably connecting said plurality of gears in driving relation to the driven member.

16. An infinitely variable speed transmission adapted to operably connect a driving member and a driven member comprising an eccentrically movable gear operably connected with said driving member for rotative movement and adapted to be moved from concentric position to eccentric position and return, a plurality of gears disposed in spaced relation around the movable gear and adapted for outward movement away from the point of rotation of said movable gear, all of said plurality of gears being adapted to mesh with said movable gear when said movable gear is in concentric position and one or more of said plurality of gears being adapted when in outward position to mesh with said movable gear when said movable gear rotates in its eccentric position, and means for operably connecting said plurality of gears in driving relation to the driven member.

17. An infinitely variable speed transmission adapted to operably connect a driving member and a driven member comprising an eccentrically movable gear operably connected with said driving member for rotative movement and adapted to be moved from concentric position to eccentric position and return, a plurality of gears disposed in spaced relation around the movable gear and adapted for outward movement away from the point of rotation of said movable gear, all of said plurality of gears being adapted to mesh with said movable gear when said movable gear is in concentric position and one or more of said plurality of gears being adapted when in outward position to mesh with said movable gear when said movable gear rotates in its eccentric position, common gear means operably connected with each of said plurality of gears and adapted to be driven by those of said plurality of gears in meshing engagement with said movable gear and to drive those of said plurality of gears out of meshing engagement when said plurality of gears are in outward adjusted position, and means operably connecting said common gear means in driving relation to said driven member.

18. An infinitely variable speed transmission adapted to operably connect a driving member and a driven member comprising an eccentrically movable gear operably connected with said driving member for rotative movement and adapted to be moved from concentric position to eccentric position and return, a plurality of gears disposed in spaced relation around the eccentrically movable gear and adapted to mesh with said movable gear as it rotates in its concentric and eccentric positions, rockable means for supporting said plurality of gears and adapted upon rocking movement to move said plurality of gears outwardly away from the point of rotation of said eccentrically movable gear and return, means for rocking said rockable members to outward position and return upon movement of the eccentrically movable gear to eccentric position and return, and means for operably connecting said plurality of gears in driving relation to the driven member.

19. A variable speed power transmitting mechanism comprising a driving member, a driven member, a planetary gear train operatively connecting said driving member with the driven member comprising a sun gear, a plurality of planet gears in meshing engagement with said sun gear and an internal orbit gear in meshing engagement with said planet gears, and means for varying the speed of rotation of said internal gear to effect a variation in the speed of rotation of the driven member comprising an eccentric gear operably connected with and driven by said driving member and adapted to be moved relative to its point of rotation from concentric to eccentric position and return, and means operably connecting said eccentrically movable gear in its concentric and eccentric positions with said internal gear.

20. A variable speed power transmitting mechanism comprising a driving member, a driven member, a planetary gear train operatively connecting said driving member with the driven member comprising a sun gear adapted to be driven by the driving member, a plurality of planet gears in meshing engagement with said sun gear and operably engaged with the driven member to cause rotation of the driven member upon movement of said planet gears in their orbit about the sun gear, and an internal orbit gear in meshing engagement with said planet gears, and means for varying the speed of rotation of said internal gear to effect a variation in the speed of rotation of the driven member comprising an eccentric gear operably connected with and driven by said driving member and adapted to be moved relative to its point of rotation from concentric to eccentric position and return, and means operably connecting said eccentrically movable gear in its concentric and eccentric positions with said internal gear.

21. A variable speed power transmission mechanism comprising a driving member, a driven member, a planetary gear train operably connecting the driving member with the driven member and having three types of gears comprising a sun gear, an internal orbit gear and a plurality of planet gears in meshing engagement with said sun gear and said internal gear, one of said types of gears being the driving element of the train, and another of said type of gears being the driven element of the train, and means for varying the speed of movement of the third type of gear of the planetary train to effect a variation in the speed of rotation of the driven member comprising an eccentric gear operably connected with and driven by said driving member and adapted to be moved relative to its point of rotation from concentric to eccentric position and return, and means operably connecting said eccentrically movable gear in its concentric and eccentric positions with said third type of gear of the planetary train.

GEOFFREY M. HARRY.

CERTIFICATE OF CORRECTION.

Patent No. 2,376,429. May 22, 1945.

GEOFFREY M. HARRY.

It is hereby certified that error appears in the printed specification of the above numbered patent requiring correction as follows: Page 6, first column, line 56, claim 2, for "other" read --another--; page 7, second column, line 62, claim 9, for "driven" read --driving--; page 8, first column, line 46, claim 11, for "rotatble" read --rotatable--; and the said Letters Patent should be read with this correction therein that the same may conform to the record of the case in the Patent Office.

Signed and sealed this 21st day of August, A. D. 1945.

Leslie Frazer (Seal)　　　　　　　　　　　First Assistant Commissioner of Patents.